T. WEAVER.
Corn Sheller.
No. 101,949.
Patented April 12, 1870.
Fig. 1
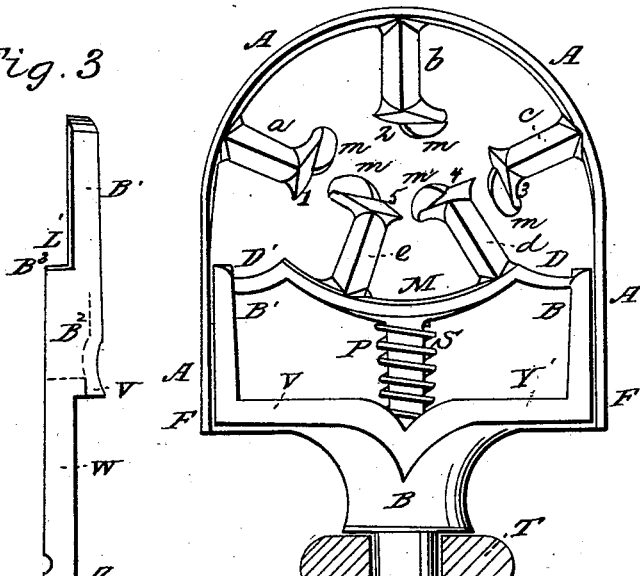
Fig. 2
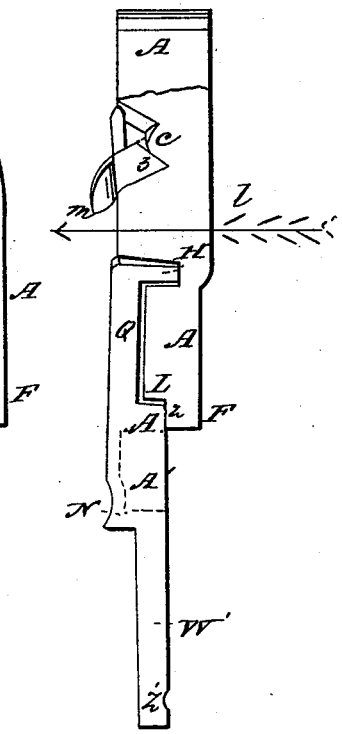
Fig. 3
Fig. 5
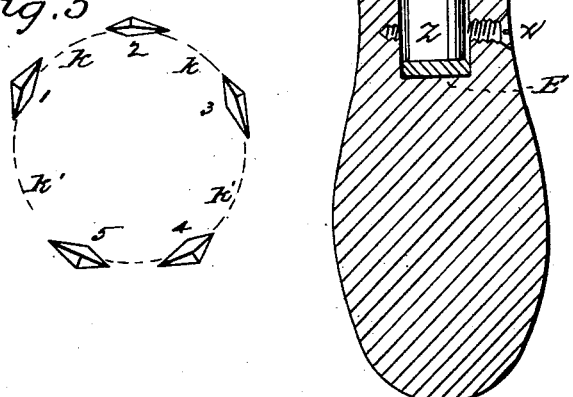
Fig. 4
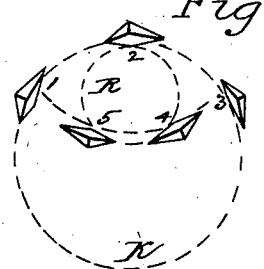
Witnesses:
Peter Strucker
Henry Hillegas
Inventor:
Theophilus Weaver

United States Patent Office.

THEOPHILUS WEAVER, OF HARRISBURG, PENNSYLVANIA.

Letters Patent No. 101,949, dated April 12, 1870.

IMPROVEMENT IN HAND CORN-SHELLERS.

The Schedule referred to in these Letters Patent and making part of the same.

I, THEOPHILUS WEAVER, of the city of Harrisburg, county of Dauphin and State of Pennsylvania, have invented an Improved Hand Corn-Sheller, of which the following is a specification.

The nature and objects of my invention consist—

First, in so forming of cast-iron its three parts that they may be applied ready for use, without dressing, by simply attaching a handle to them by a wood-screw or pin.

Second, in so adapting the implement that it will expeditiously shell or cut dry or green corn, wind the ear through regularly, shield the hand from injury, and the detached grains from scattering.

In the accompanying drawings—

Figure 1 is a perspective view of the implement on a front view, and showing the handle in longitudinal section, and in the plane of the parting line of shanks, spring receptacle, and base of frames.

Figure 2 is a sectional view of the major frame.

Figure 3 is a sectional view of the minor frame.

Figs. 2 and 3 show the frames facing each other as they are to be applied to each other.

Figure 4 is a plan of the barbs in position, as when the plunger is fully thrown.

Figure 5 is a plan of the barbs in position, as when the plunger is fully withdrawn.

Figs. 1, 2, and 3, show the three cast-iron parts, namely, plunger D M D' P, arch or major frame A F W' Z', and minor or cap frame B¹ B² W Z, respectively, combined and applied as shown in fig. 1, on handle E T.

T is a swell or bulb on the handle, to add strength without the use of ferrule.

E is a bore or socket, to receive tightly the shanks W W' in it, which are half-round hollow sections, and are held in socket E by a wood-screw or pin X, the shanks being cut at their parting line to admit said screw or pin transversely, as shown in figs. 2, 3, and 1.

The major and minor frames are similarly formed from the shanks W W' up to the line of plunger-head D M D', and have a form, when viewed in front and rear, as shown in fig. 1.

Above the shanks W W' is a hollow flared neck, whose inside forms a receptacle for the support of a coiled spring, S.

The stem P of plunger is guided in and fills the hollow of the shanks W W', and the spring rests in the receptacle A' B², figs. 2 and 3, around said stem, and acts under plunger-head to throw it forward, as shown in fig. 1.

Beyond said neck, shown at B, fig. 1, the frames branch out at right angles to the line of the handle, and in the plane of the frame parting, as shown at V V', fig. 1.

At the extremities of branches V V', the minor frame has two parallel standards, B B¹, at right angles to branches V V', and the major frame has ledges Q, fig. 2, equivalent to said standards in form and position.

Said ledges and standards are cut away partly at L L', respectively, to form, when the frames are joined, receptacles for the stays D D' of plunger, to traverse, as shown in figs. 1, 2, and 3; said ledges and standards, therefore, become guides, and top ledges H, formed transversely on ledges Q, become stops to limit the throw of the plunger, and also to gauge the breadth of the receptacles for the stays D D', which must play freely between their guides.

The ledges Q and H are massed into the lower ends or straight sides of the elongated hoop on major frame, inside, and the standards B B¹ lie snugly inside the same straight sides F, fig. 1, which thus serve as flanges to keep the cap or minor frame rightly imposed on the major frame.

The hoop or arch A of major frame is semicircular, with straight sides F, which extend as tangents to the semicircle, and are parallel to the axis of the handle, as shown in fig. 1.

The head proper M of the plunger, from stay D to stay D', is a segment of a circle of the same diameter as that of the arch A.

The straight sides F of the arch are of such length, in relation to plunger-head M and center of arch A, that when the plunger is fully withdrawn, the curve of head M will coincide with the circle of the arch, thus admitting a large ear of corn equally and freely, as hereinafter shown, and the stays D D' are so curved back that the plunger-head may pass forward far enough to act properly on a small ear of corn.

The hoop or arch A and head M are in the same plane on both their edges, and are of sufficient depth to shelter the shelling and winding studs, which are formed on their side toward the center of circle, and near the outer or rear edges, as shown in fig. 2.

The hoop or arch A and head M thus act as shields to catch the detached grains, which have a tendency to fly off the cob at right angles, and also to protect the hand against injury from the barbs while rotating the ear through the sheller, which is inserted in a direction as shown at l, fig. 2, and wound through centrally.

The shelling and winding-studs are five in number, and are all similarly formed. Three are located on the inside of the arch on major frame, and two on the front side or head of the plunger, spaced as shown in fig. 1, and arranged in direction with the radii of the circle of the arch and plunger-head.

Each stud consists of a shank, $a$, $b$, $c$, $d$, or $e$; a barb, 1, 2, 3, 4, or 5, and a shear, $m$. Each shank is a straight triangular prism, with edge turned toward the front side of sheller, to secure greatest strength and to least hinder egress of detached grains, which pass out at the rear, and its trunk end is massed strongly into arch of major frame or plunger-head, while its taper end is armed with a barb and shear. Each barb is a triangular body, with its apex pointing slightly outward from, and its greatest face arranged vertically toward the center of the circle of the arch.

The apex is so inclined outwardly to conform to the taper of a corn-cob, which enters point foremost, as stated, and to prevent the barbs entering the nap on the cob too sharply in dislodging the grains.

The right or shortest edge of the barb is the cutting-edge, as the ear is rotated from left to right.

Each shear is a continuation of the barb at its base, and is on its left side, points obliquely toward the rear of the frame A, and projects inward from the barb face toward the center of the frame. It is placed at the base of the barb, and projects inwardly from it, that it may travel keenly around the cob, treading in its nap, while the barb is at work or shelling, its obliquity, in combination with the other shears and the plunger spring, serving to pass the cob regularly and rapidly through the frame.

It is desirable to pass the cob through thus regularly to make clean work, and to avoid forcing by hand, as the latter endangers the hand in front of the barbs, on account of the uncertainty as to the amount of force which is to be used, different ears differing greatly in toughness.

The arrangement of the five studs is such that when the plunger is fully thrown, the two studs on it, and the middle stud on the arch, may present their barbs at the angles of an equilateral triangle, or at regular intervals on the circumference of a small circle, shown in figs. 1 and 4, while the two side studs on the arch stand outside of said circle so as not to hinder the throw of the plunger.

This arrangement further contemplates forming a larger circle of studs, as shown in fig. 5, when the plunger is fully withdrawn, the studs then being at the angles of a nearly regular pentagon. By this arrangement, the points of small ears, as well as the butts of large ones will be properly acted upon by the barbs to insure thorough work, and the cob cannot be thrown out of its proper central position between the barbs.

The shanks of the studs are long enough to remove the barbs and shears in from the arch and plunger-head sufficiently to allow the crowns of the longest grains to pass clear of arch and head, and therefore never hinder the introduction of the ear.

The advantages have been shown in the foregoing specification, except that this implement can scarcely be surpassed in cheapness, while its efficiency is certain.

I claim—

1. The major and minor frames, when they are provided with shanks W W', spring receptacles $A'$ $B^2$, stay receptacles L L', ledges or standards Q $B^1$, respectively, and adapted to be applied to each other, substantially in the manner as and for the purpose hereinbefore set forth.

2. Providing major frame with arch A, spanning the straight sides F, and forming plunger-head M curved, that arch and head may conjointly shield the hand of the operator, and arrest detached grains, in the manner herein set forth.

3. The studs, when solidly attached to arch A and plunger-head M, by the shanks $a$ $b$ $c$ $d$ $e$, and when furnished with the shelling-barbs 1 2 3 4 5, and the winding shears $m$, all constructed and arranged in the manner as and for the purpose set forth.

4. The combination of plunger M with the major and minor frames, when its stem P is inserted in the cavity of the hollow two-part shanks W W' in the handle in the manner set forth.

5. The combination of shanks W W' with handle E T, by means of screw or pin X, in the manner herein set forth.

THEOPHILUS WEAVER.

Witnesses:
  PETER STIECKER,
  HENRY HILLEGAR.